(12) United States Patent
Zajcev et al.

(10) Patent No.: US 7,998,334 B2
(45) Date of Patent: Aug. 16, 2011

(54) METHOD, AN APPARATUS, A CONTROL SYSTEM AND A COMPUTER PROGRAM TO PERFORM AN AUTOMATIC REMOVAL OF CATHODE DEPOSITIONS DURING A BIPOLAR ELECTROCHEMICAL MACHINING

(75) Inventors: Alexandr Nikolaevich Zajcev, Ufa (RU); Nasich Zijatdinovich Gimaev, Ufa (RU); Natalya Markelova, Ufa (RU); Viktor Nikolaevich Kucenko, Ufa (RU); Aleksandr Leonidovich Belogorsky, Ufa (RU); Rafail Ramzisovich Muchutdinov, Ufa (RU); Igor Leonidovich Agafonov, Ufa (RU)

(73) Assignee: Koninklijke Philips Electronics, N.V., Eindhoven (NL)

( * ) Notice: Subject to any disclaimer, the term of this patent is extended or adjusted under 35 U.S.C. 154(b) by 2026 days.

(21) Appl. No.: 10/511,811

(22) PCT Filed: Apr. 22, 2003

(86) PCT No.: PCT/IB03/01569
§ 371 (c)(1),
(2), (4) Date: Oct. 19, 2004

(87) PCT Pub. No.: WO03/090963
PCT Pub. Date: Nov. 6, 2003

(65) Prior Publication Data
US 2005/0205432 A1    Sep. 22, 2005

(30) Foreign Application Priority Data
Apr. 23, 2002 (WO) ................. PCT/IB02/02807

(51) Int. Cl.
*B23H 3/02* (2006.01)

(52) U.S. Cl. .............. 205/641; 205/646; 204/228.7; 204/229.2

(58) Field of Classification Search .......... 205/646, 205/658, 659, 641; 204/28, 36, 57, 228.7, 204/229.2
See application file for complete search history.

(56) References Cited

U.S. PATENT DOCUMENTS

| | | | |
|---|---|---|---|
| 3,654,116 A | 4/1972 | Inoue | |
| 5,833,835 A | 11/1998 | Gimaev et al. | |
| 6,402,931 B1 * | 6/2002 | Zhou et al. | 205/659 |
| 6,558,231 B1 * | 5/2003 | Taylor | 451/36 |

* cited by examiner

*Primary Examiner* — Alexa D. Neckel
*Assistant Examiner* — Nicolas A. Smith

(57) ABSTRACT

The invention relates to a method, an apparatus and a computer program for electrochemical machining where a removal of cathode depositions is performed in a fully automated way by means of an application of optimal pulses of a suitable polarity. The method comprises establishing an optimal pulse duration for pulses of the inverse polarity for a removal of the cathode depositions from an electrode surface during the electrochemical machining, said optimal pulse duration being determined from a first calibration carried out preceding the machining of the work piece and a second calibration carried out during the machining of the work piece; performing a control of the machining of the work piece by means of a monitoring of an actual value of an operational parameter and comparing said actual value of the operational parameter to a preset value of the operational parameter, applying a pulse of the inverse polarity of the optimal pulse duration in case the actual value of the operational parameter is greater than the preset value of the operational parameter. The operation of the apparatus 4 in a machining mode is controlled by a process control means C. The operation of the apparatus 4 in an electrode cleaning mode is controlled by the control system C2 arranged to remove the cathode depositions from the surface of the electrode in real time.

15 Claims, 5 Drawing Sheets

METHOD, AN APPARATUS, A CONTROL SYSTEM AND A COMPUTER PROGRAM TO PERFORM AN AUTOMATIC REMOVAL OF CATHODE DEPOSITIONS DURING A BIPOLAR ELECTROCHEMICAL MACHINING

The invention relates to a method for determining an optimal mode for a removal of cathode depositions from an electrode during an electrochemical machining of an electrically conductive work piece in an electrolyte by means of applying bipolar electrical pulses between the work piece and the electrode, one or more voltage pulses of an unipolar machining polarity being alternated with voltage pulses of an inverse polarity while a gap between the work piece and the electrode is maintained, said gap being filled by the electrolyte.

The invention further relates to a method for electrochemical machining of an electrically conductive work piece in an electrolyte by applying bipolar electrical pulses between the work piece and an electrode, one or more voltage pulses of an unipolar machining polarity being alternated with voltage pulses of an opposite polarity, while a gap between the work piece and the electrode in maintained, said gap being filled by the electrolyte.

The invention still further relates to a control system arranged to control an automatic removal of cathode depositions from a surface of an electrode during a bipolar electrochemical machining.

The invention still further relates to a computer program arranged to carry out an automatic removal of cathode depositions.

A method of a type described in the opening paragraph is known from U.S. Pat. No. 5,833,835. The known method is arranged to perform an automatic removal of cathode depositions from a front surface of the electrode during a bipolar mode of electrochemical machining of a work piece. In the known method the amplitude of the pulses of an inverse polarity is determined by two conditions, firstly a given surface quality of the work piece and secondly, by an electrode wear. It is known in the art that the surface quality of the work piece and a copying accuracy are directly proportional to the absolute value of a height of the cathode depositions on the front surface of the electrode. Therefore, the parameters of the pulses of the inverse polarity, such as a pulse duration, must be selected so that the cathode depositions on the front surface of the electrode are removed sufficiently and no electrode wear occurs.

It is a disadvantage of the known method that there is no means to quantify an extent of the cathode depositions and therefore it is difficult to select an optimal mode for the pulse duration of the pulses of the inverse polarity for the removal of the cathode depositions.

It is an object of the invention to provide a method for determining the optimal mode for the removal of cathode depositions, where such a removal is performed with a high accuracy by means of pulses of the inverse polarity.

To this end the method according to the invention is characterized in that for said optimal mode an optimal duration of the pulses of the inverse polarity is selected, said optimal duration being determined from a first calibration carried out preceding the machining of the work piece and a second calibration carried out during the machining of the work piece.

The technical measure of the invention is based on an insight that by performing the first calibration prior to the machining of the work piece an information can be collected upon a relation between an expected extent of the cathode depositions on the front surface of the electrode and an optimal duration of the inverse pulse necessary to remove said depositions. This calibration can be performed on a basis of operational parameters of the electrochemical process. Furtheron, it is understood that during the process of the electrochemical machining the operational conditions can be disturbed causing a perturbation of the relation between the expected extent of the cathode depositions on the front surface of the electrode and an optimal duration of the inverse pulse necessary to remove said depositions. Therefore, by performing the second calibration during the electrochemical machining a corrected relation between the actual extent of the cathode depositions and the optimal inverse pulse is determined.

An embodiment of the method according to the invention is characterized in that the first calibration comprises determining a dependence between a variable having a range of values corresponding to a range of heights of the cathode depositions generated on an initially clean metallic surface and a range of pulse durations of a suitable pulse of the inverse polarity necessary to remove said depositions from said surface.

This technical measure is based on an insight that for given operational conditions, like amplitudes of the machining pulses and the amplitude of the pulses of the inverse polarity, electrolyte pressure, a dimension of the gap between the work piece and the electrode, there is a unique dependence between an assigned variable representative to the extent of the cathode depositions and the required pulse duration for the pulses of the inverse polarity necessary to remove said depositions. This dependence is proved to be invariant to the material and the geometry of the electrode, a composition and a property of the electrolyte. Preferably, an absolute value of the height of the cathode depositions is selected as the variable. The first calibration can be derived experimentally or can be compiled on a basis of literature or other data.

A further embodiment of the method according to the invention is characterized in that the first calibration comprises the steps of:

performing a machining of a set of samples with unipolar machining pulses in order to yield a range of surface conditions;

assigning variables characterizing the yielded surface conditions;

applying a pulse of the inverse polarity having a pulse duration per sample in order to remove yielded surface conditions;

performing a calibration of a dependence between the variables and the inverse pulse durations required to remove said yielded surface conditions from the samples.

According to the present embodiment the first calibration is carried out experimentally, comprising the following steps: first, a range of different heights of the cathode depositions is obtained on a set of non-machined samples. The absolute value of the height of the cathode depositions is measured and a corresponding value of an operational parameter, for example the cathode potential is measured as well. Next, a pulse of an inverse polarity is applied per sample, said pulse having a sufficient pulse duration to remove the cathode depositions without an electrode wear. This pulse duration is the optimal pulse duration. The resulting dependence between the height of the cathode depositions and the optimal pulse duration constitutes the first calibration. For intermediate values of the height the measurement data are interpolated to obtain corresponding optimal inverse pulse durations. An example of such a dependence will be discussed with reference to FIG. 1.

An embodiment of the method according to the invention is characterized in that the second calibration comprises the steps of:

performing a machining of the work piece by applying one or more pulses of the unipolar machining polarity until a first a-priori defined condition is satisfied, said machining resulting in a first condition of a surface of the electrode performing a measurement of a first value of an operational parameter representative to the first condition of the surface of the electrode;

assigning a variable characterizing the first condition of the surface of the electrode;

performing an application of a pulse of the inverse polarity corresponding to the first condition of the surface of the electrode, said application resulting in a second condition of the surface of the electrode, parameters of said inverse pulse being determined from the first calibration;

performing a measurement of a second value of the operational parameter representative of the second condition of the surface of the electrode;

performing a calibration of the variable based on the first value and the second value of the operational parameter.

According to the technical measure of the present embodiment the second calibration is performed during the electrochemical process in order to take into account possible perturbations of the dependence between the assigned variable representative to the surface condition of the electrode and the optimal duration of the inverse pulses. Furtheron, the present embodiment is based on an insight that the absolute value of the operational parameter representative of the absolute value of the assigned variable can be altered during the electrochemical process. It is understood that, for example if the cathode potential is selected as the operational parameter it has different values for a clean, non-machined surface of the electrode and for the of the electrode which has been cleaned by means of an application of a pulse of the inverse polarity. This difference is explained by the fact that during the electrochemical machining the micro-pores of the electrode surface are filled with oxide layers resulting in a change in the cathode potential. This effect will be illustrated on an example given in FIG. 3.

The method according to the present embodiment works as follows: first the work piece is machined until a certain predefined condition is satisfied. For example, the machining can be carried out for a certain period of time, or until substantial extent of the cathode depositions is detected or until a maximum allowable extent of the cathode depositions is detected. The maximum allowable extent of the cathode depositions is determined by the targeted surface quality of the work piece and by the targeted copying accuracy. For example, in case the maximum allowable extent of the cathode depositions is selected as the a-priori defined condition, then a first value of the operational parameter representative to said extent of the cathode deposition is measured. An example of such an operational parameter is a cathode potential measured at the surface of the electrode. Based on the results of the first calibration, the pulse duration for the inverse pulse necessary to remove said cathode calibration is selected. At this step the data of the first calibration are still valid due to the fact that the initial condition corresponded to a clean surface of the electrode. After the optimal pulse of the inverse polarity is applied the surface of the electrode is cleaned and might have a different cathode potential than the clean surface. Therefore according to the technical measure the operational parameter is measured once more for a cleaned electrode surface. This value is then used to re-scale the dependence between the selected variable, for example the absolute value of the height of the cathode depositions, and the operational parameter, for example a cathode potential under operational conditions. Thus, as a result of the second calibration a rescaled dependence between, for example an absolute value of the height of the cathode depositions and the operational parameter, for example the cathode potential is derived under machining conditions. This calibration together with the results of the first calibration is then used to determine the optimal pulse duration for removal of the cathode depositions. According to the technical measure of the present embodiment it is thus possible to quantify the height of the cathode depositions during machining and to select the optimal duration of the pulse of the inverse polarity based on the value of the height. The suitable time to perform the measurement of the operational parameter during the electrochemical process will be discussed with reference to FIGS. 2 and 3. Due to the fact that the extent of the cathode depositions is quantified the method according to the invention presents means for an accurate removal of the cathode depositions without electrode wear.

An embodiment of the method according to the invention is characterized in that in a region, corresponding to an interval between the unipolar machining voltage pulses, an area under a curve of the electrode potential is derived, said area being selected as the operational parameter. This technical measure is particularly suited for operational conditions with a high electrolyte flow or for small electrolyte paths, or for larger values of the gap. Under these conditions it is not favorable for the cathode depositions to be generated to a great extent, resulting in minor changes in the absolute value of the cathode potential. It is more sensitive therefore to quantify the extent of the cathode depositions by analyzing the curve of the electrode potential.

A further embodiment of the method according to the invention is characterized in that for short intervals between unipolar machining voltage pulses a slope of the curve of the electrode potential is derived in an interval between the unipolar machining voltage pulses, said slope being selected as the operational parameter. It has been found that the value of the cathode potential does not stabilize between the machining pulses with a high repetition rate, the slope of the curve being a better parameter for said quantification.

A still further embodiment of the method according to the invention is characterized in that the absolute value of the first harmonics of the Fourier transform of a cathode potential pulse is selected as the operational parameter.

This technical measure is particularly favorable for very short intervals between the machining pulses and it is proved that the Fourier coefficients are more sensitive to the cathode depositions than the absolute value of the cathode potential.

A further object of the invention is to provide a method of electrochemical machining where the cathode depositions are removed from the front surface of the electrode by means of the optimal pulses of the inverse polarity.

A method for electrochemical machining according to the invention is characterized in that said method comprises the steps of:

establishing an optimal pulse duration for pulses of the inverse polarity for a removal of the cathode depositions from an electrode surface during the electrochemical machining, said optimal pulse duration being determined from a first calibration carried out preceding the machining of the work piece and a second calibration carried out during the machining of the work piece;

performing a control of the machining of the work piece by means of a monitoring of an actual value of an operational parameter and comparing said actual value of the operational parameter to a preset value of the operational parameter;

applying a pulse of the inverse polarity of the optimal pulse duration in case the actual value of the operational parameter is greater than the preset value of the operational parameter.

According to the method of the invention first, the optimal pulse duration for pulses of the inverse polarity is established. This can be done in accordance with the method for determining an optimal mode for a removal of cathode depositions discussed above. The control of the machining process is then performed according to the operational parameter being monitored, for example the absolute value of the cathode potential, or another suitable parameter. The application of the inverse pulses is performed in case the monitored operational parameter exceeds a preset value. A suitable preset value can be chosen to be related to the maximum allowable thickness of the cathode depositions.

A still further object of the invention is to provide a control system arranged to control the automatic removal of cathode depositions, where said removal is performed by means of optimal pulses of the inverse polarity.

The control system according to the invention is characterized in that said system comprises probing means arranged to perform a measurement of a value of an operational parameter;

calibration means arranged to perform a numerical calibration of a variable representative to a condition of the surface of the electrode based on the value of the operational parameter;

a storage unit arranged to store a dependence between the variable and a duration of an optimal inverse pulse necessary to remove said condition;

monitoring means arranged to monitor an actual value of the operational parameter;

a logical unit arranged to compare said actual value of the operational parameter with a preset value of the operational parameter and to actuate an application of the optimal pulses of inverse polarity in case the actual value of the operational parameter is greater than the preset value of the operational parameter, parameters of the inverse pulse being determined by the calibration and the dependence stored in the storage unit.

The control system according to the invention is arranged to perform the automatic process control and to actuate a procedure for the automatic removal of the cathode depositions based on a monitored operational parameter. The advantage of the control system according to the invention is that it is suited for an accurate determination of the extent of the cathode deposition resulting in an accurate removal thereof from the surface of the electrode without any electrode wear. The parts of the control system will be explained in more detail with reference to FIG. 4.

A still further object of the invention is to provide a computer program arranged for interfacing between the control system and the apparatus for electrochemical machining, the results of the electrochemical machining being visualized to a user in an automatic mode. A computer program according to the invention is arranged to be loaded in to a computer and to control the computer, when loaded, to function as the control system.

The advantage of the computer program according to the invention is that it provides means to implement an accurate removal of the cathode depositions from the surface of the electrode in an accurate manner without any electrode wear.

The detailed description of the computer program will be given with reference to FIG. 8.

These and other aspects of the invention are discussed with reference to the Figs.

Figure 4:
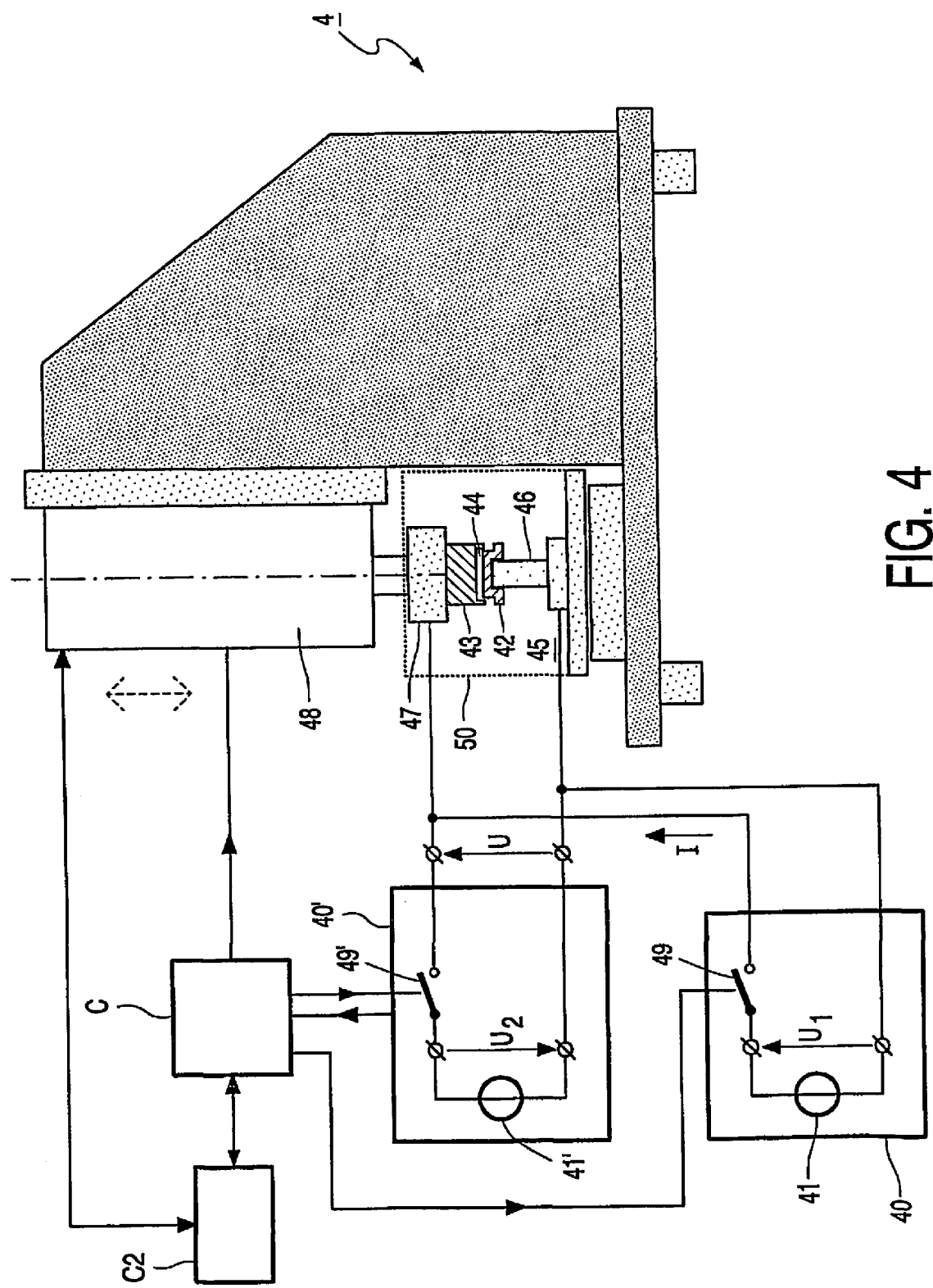

FIG. 4 present in a schematic way an embodiment of an apparatus for the electrochemical machining according to the invention.

Figure 5:
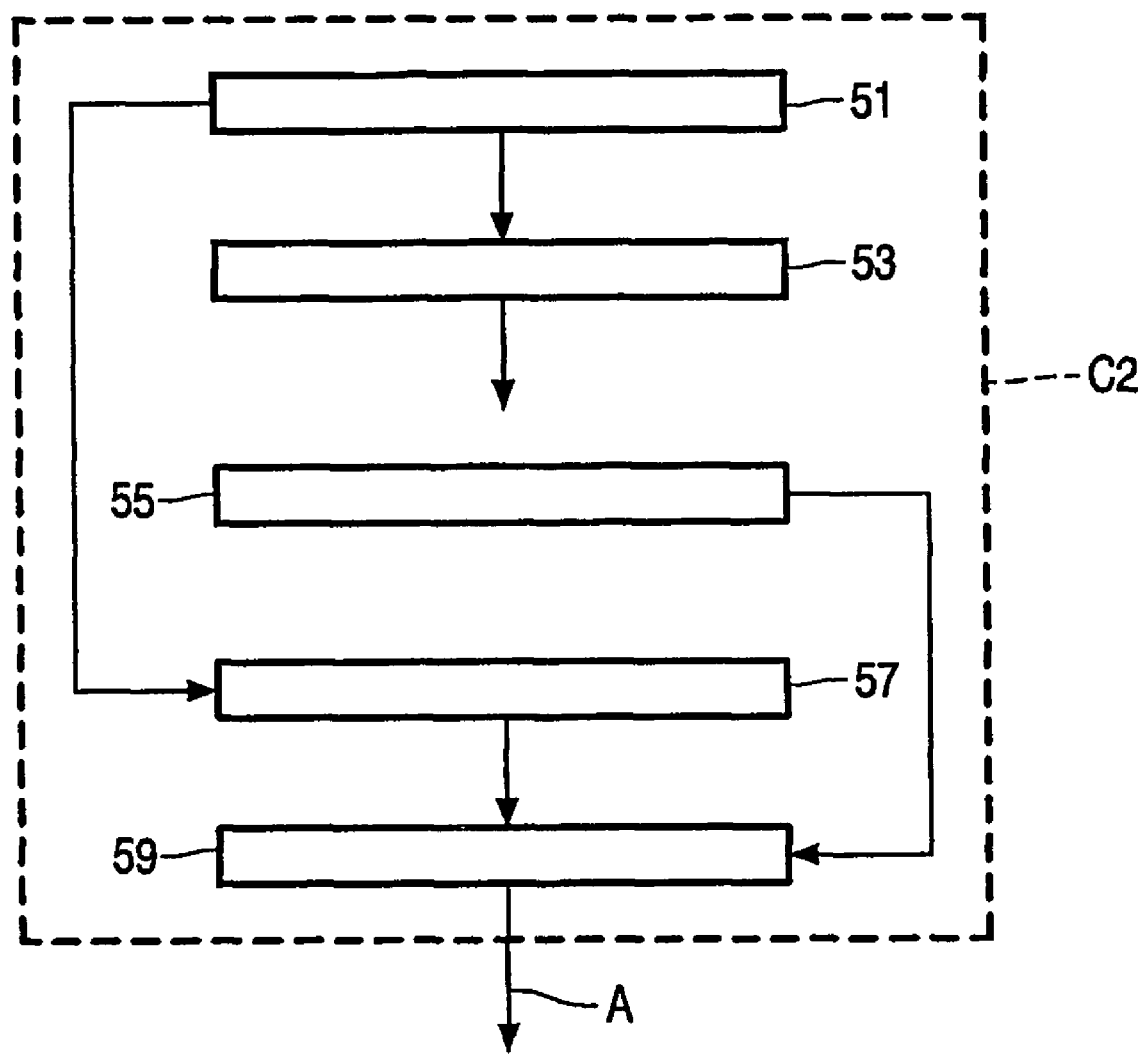

FIG. 5 presents in a schematic way an embodiment of the control system according to the invention.

Figure 6:
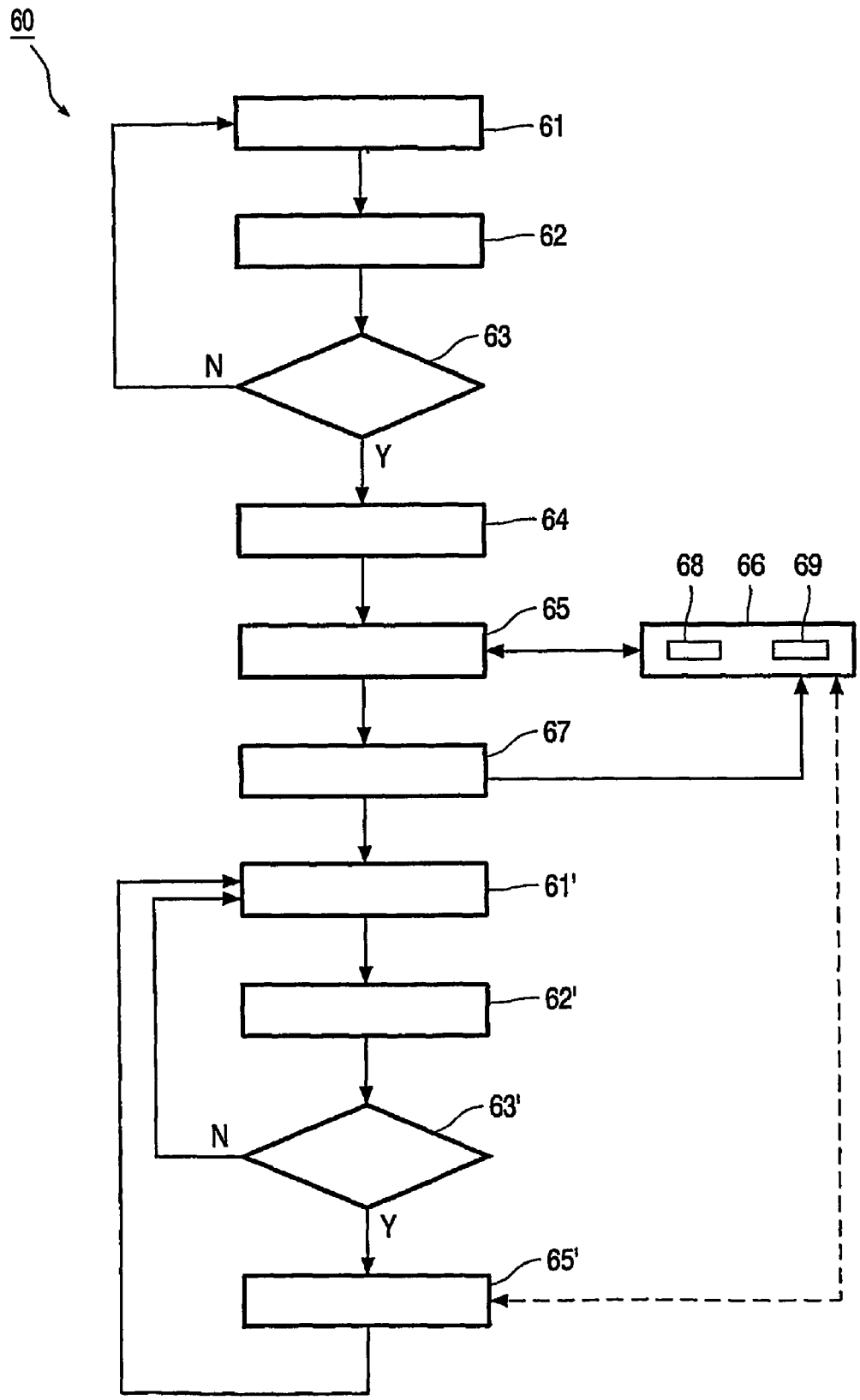

FIG. 6 presents in a schematic way an embodiment of the computer program according to the invention.

Figure 7:
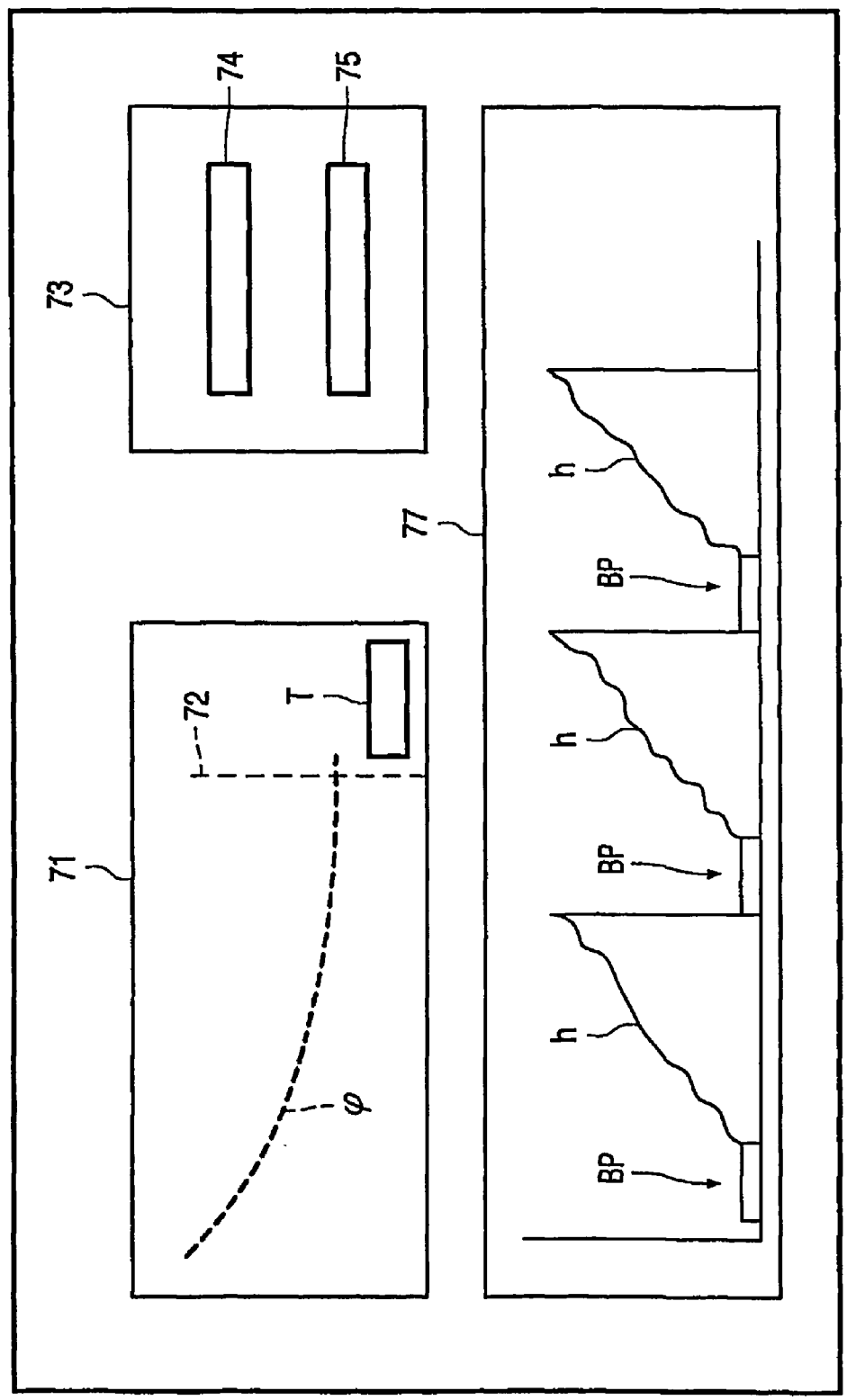

FIG. 7 presents in a schematic way an embodiment of a main window of the user interface of the computer program according to the invention.

Figure 1:
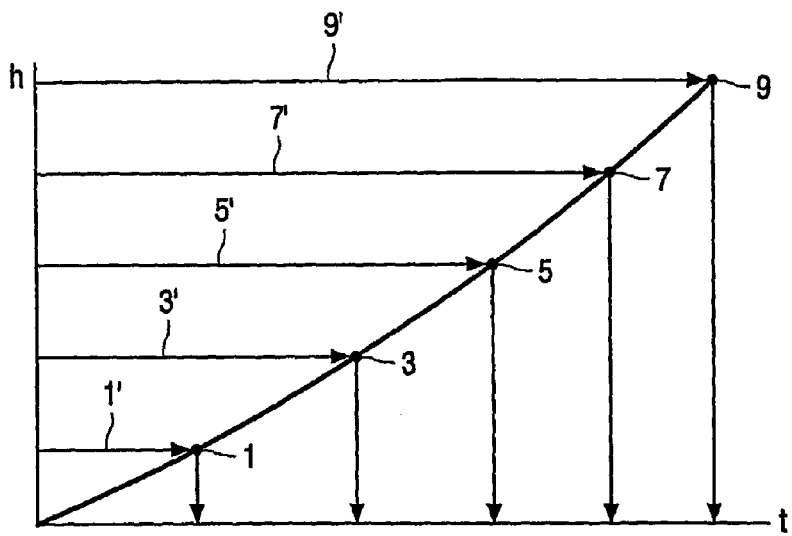
FIG. 1 shows an example of the first calibration of the dependence between the height of the cathode depositions and the optimal pulse duration for the pulse of the inverse polarity.

FIG. 1 shows an example of the first calibration of the dependence between the height h of the cathode depositions and the optimal pulse duration t for the pulses of the inverse polarity. Based on the experimental results it is found that there is a unique dependence between the height and the duration of the optimal pulse of the inverse polarity necessary to remove said depositions, the depositions being generated under certain operational parameters (type and pressure of an electrolyte, amplitude and duration of the pulses of the machining polarity, absolute value of the gap, etc.). Therefore, by performing a calibration of the dependence between the height and the pulse duration, the optimal pulse of the inverse polarity can be selected to remove the cathode depositions during the electrochemical process. In the Fig., the measured values 1,3,5,7,9 are given by the arrows 1', 3', 5', 7', 9' the entire curve 2 being a result of the interpolation between the measurement points. Eventually, for heights beyond the measured data, the dependence can be extrapolated. By storing this dependence in a control unit for the electrochemical machining the real-time cleaning of the cathode depositions can be performed in an accurate way. Evidently, it is possible to store a plurality of such dependencies representing different operational conditions. In order to evaluate a value of the height of the cathode depositions a cathode potential is used. The absolute value of the cathode potential is measured in the interval between the pulses of the machining polarity, which is schematically illustrated in FIG. 2.

Figure 2:
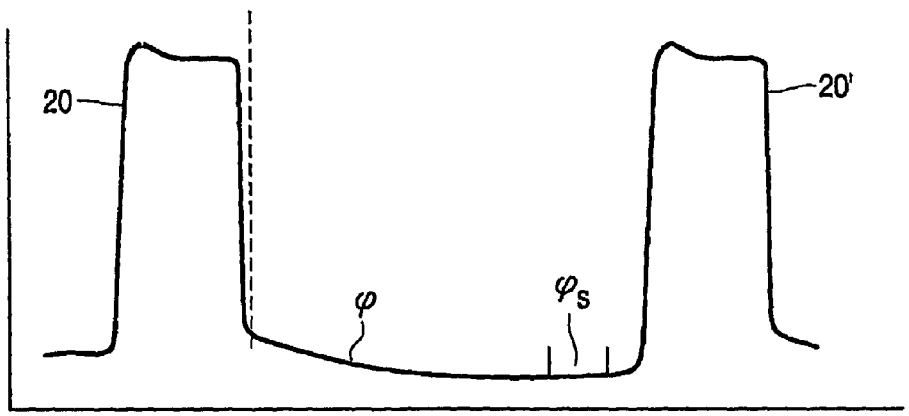
FIG. 2 shows an example of an characteristic oscillogram acquired during the electrochemical machining.

FIG. 2 shows an example of a characteristic oscillogram acquired during the electrochemical machining. The course of the pulse of the machining polarity is schematically given by 20, the course of the cathode potential after the termination of the pulse 20 is given by $\phi$. It is seen, that the value of the cathode potential $\phi$ decreases with time and at some point a saturated value $\phi_s$ is reached. It is possible to install the measurement of the cathode potential based on the insight about the time required for the cathode potential to reach the saturated value $\phi_s$, or to perform the measurement of $\phi_s$ directly preceding the next machining pulse 20'. As the saturated value of the cathode potential is directly proportional to the absolute value of the height of the cathode depositions, the absolute value of the height of the cathode depositions can be deduced.

Figure 3:
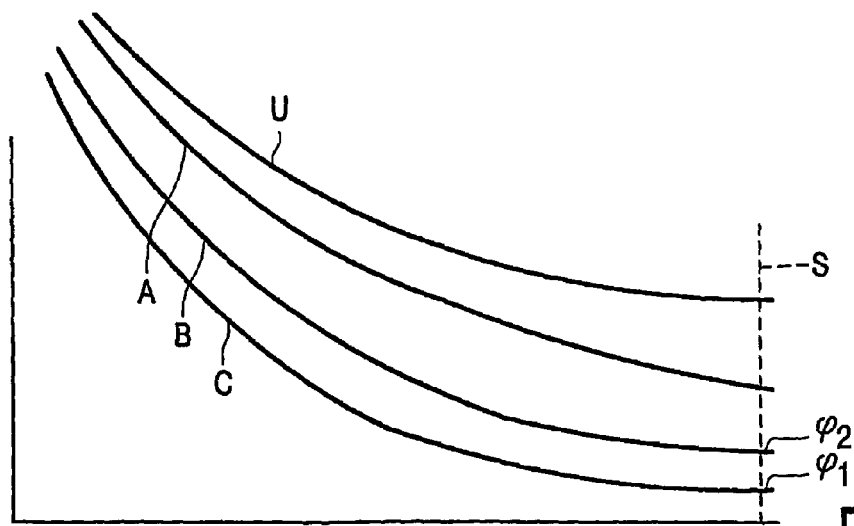
FIG. 3 shows an example of the course of the cathode potential between the pulses of the machining polarity for different electrode conditions.

FIG. 3 shows an example of the course of the cathode potential between the pulses of the machining polarity for different electrode conditions. In the fig. a curve C illustrates the course of the cathode potential of the electrode for an initially clean, non-machined electrode surface, a curve B shows the course of the cathode potential for the electrode surface after a cleaning operation by means of an application of an optimal pulse of the inverse polarity, the curve U shows the course of the cathode potential after a series of unipolar machining pulses, where a maximum allowable cathode depositions were generated, the curve A shows the course of the cathode potential in an intermediate situation where the cathode depositions are less than maximum allowable. As is seen from the FIG. 3 at a saturation region of the cathode potentials S, there is a discrepancy between the absolute value of the cathode potential corresponding to a clean, respectively cleaned electrode surface. Therefore, the new value of the cathode potential corresponding to a zero height of the cathode depositions is $\phi 2$, and not the initial value $\phi 1$. The former value is must therefore be taken to re-scale the dependence between the absolute height of the cathode depositions and the measured actual value of the cathode potential under operational conditions.

FIG. 4 presents in a schematic way an embodiment of an apparatus 4 for the electrochemical machining of an electrically conductive work piece 42 by means of an electrode 43. The apparatus 4 comprises a base 46 for positioning a work piece 42, a holder 47 for positioning an electrode 43, and an actuator 48 for moving the holder 47 and the base 46 with respect to one another. The base 46 and the actuator 48 are mounted on a chassis (not shown) having a rigid construction so as to enable a working distance between the electrode 43 and the work piece 42 to be set with a high accuracy. The arrangement comprises further a reservoir 50 filled with an electrolyte 45 in such a manner that the gap 44 formed as a result of the working distance between the electrode 43 and the work piece 42 is filled with the electrolyte 45. In the present case the electrolyte comprises $NaNO_3$ dissolved in water. As an alternative it is possible to use another electrolyte, such as for example NaCl or a combination of $NaNO_3$ and an acid. The electrolyte 45 is pumped through the gap 44 by means of an installation, not shown in the fig. By means of the apparatus 4 the work piece 42 can be machined be passing a machining voltage pulse from a power supply unit 40 through the electrolyte 45 in the gap 44 via the electrode 43 and the work piece 42. The power supply unit 40 comprises a voltage pulse generator 41 and a controllable switch 49. When the polarity of the applied machining voltage is correct this results in material of the work piece 42 being removed from its surface and being dissolved in the electrolyte 45 at the location of a small distance between the electrode and the work piece. The shape of thus obtained cavity is determined by the shape of the electrode opposite to it. The apparatus 4 further comprises a second power supply unit 40', where a source of the voltage pulses 41' of the opposite polarity U2 is incorporated. The second power supply source comprises further a controllable switch 49' to be operated by the process control unit C. In case it is detected that the machining pulses U1 are to be alternated with the pulses of the opposite polarity U2, the process control unit C alternatively operates the controllable switches 49' and 49 to supply a voltage pulse of suitable polarity to the gap (44). It is also possible to use a power supply, where the first and the second power supply sources are integrated and constitute a single power supply source, which is programmable by the process control means C to deliver alternating voltage pulses of opposite polarity. The apparatus 4 according to the invention comprises further a control system C2 arranged to control an automatic removal of cathode depositions from the surface of the electrode. The control system C2 is arranged to communicate to the process control means C, preferably by means of a RS232 interface. Also, the control system C2 is arranged to perform a measurement and a monitoring of the value of the cathode potential. The control system C2 is discussed in more detail with reference to FIG. 5.

FIG. 5 presents in a schematic way an embodiment of the control system C2 according to the invention. The control system comprises probing means 51 arranged to perform a measurement of a value of the cathode potential, for example by means of a digital oscilloscope (not shown). The control system C2 comprises further calibration means 53 arranged to perform a numerical calibration of a height of the cathode depositions based on the measured value of the cathode potential. In order to perform this calibration the calibration means address a table (not shown) stored in a storage unit 55 where the absolute value of the height of the cathode depositions is set out against the values of the cathode potential for an initially non-cleaned electrode surface. Prior to the first cleaning operation this table is used to estimate the value of the height. After at least one cleaning operation is performed, the relation between the height and the cathode potential is changed, as is explained with reference to FIG. 3. The calibration means 53 are therefore arranged to perform a re-calibration of said relation based on the measurement of the cathode potential after the electrode surface is cleaned with an optimal pulse. The re-calibration results are stored in the storage unit 55 and are written in a corrected table (not shown) which is addressed furtheron to determine the optimal pulse duration for the pulses of the inverse polarity during the machining. The control system C2 comprises further monitoring means 57 arranged to monitor an actual value of the cathode potential. The monitoring means 57 can be arranged to store the actual value of the cathode potential in a log file. The input of the log file can be addressed by a logical unit 59 arranged to compare the actual value of the cathode potential with a preset value of the cathode potential and to send an actuation signal A to the process control means (not shown) to actuate an application of the optimal pulses of inverse polarity in case the actual value of the cathode potential is greater than the preset value of the cathode potential. The parameters of the optimal inverse pulse are supplied by the storage unit 55 for the actual height of the cathode depositions which is calculated by the calibration means 53 based on the corrected table.

FIG. 6 presents in a schematic way an embodiment of the computer program according to the invention. The computer program 60 comprises an interface 61 to the process control means (not shown) in order to actuate the machining of the work piece by means of application of unipolar pulses of the direct polarity. The interface 62 is arranged to control the measurement of the operational parameter, for example the cathode potential. In order to perform such a control the interface 62 can be arranged to communicate to a digital oscilloscope arranged to perform said measurement. The measurement data are then supplied to the conditioning unit 63, arranged to verify whether the operational parameter did not exceed a preset value. For example, the conditioning unit 63 can be arranged to monitor a processing time, an actual value of the cathode potential or any other suitable parameter for this purpose. In case the conditioning unit 63 detects that the condition is true, the operational parameter, for example the cathode potential is measured by the probing means via the interface 64. This operation is followed by an application of the pulses of the inverse polarity, actuated by the actuation unit 65. The parameters of the optimal pulses of the inverse polarity are taken from the initial table 68, acquired according to the calibration in accordance with FIG. 1, said table 68 being stored in the storage unit 66. Next, the measurement of the value of the cathode potential corresponding to the cleaned electrode surface is actuated by the interface 67 and the corresponding value is stored as a new value for a zero height of the cathode depositions in the corrected calibration table 69 in the storage unit 66. Then the application of the machining pulses is initiated at the step 61'. The interface 62' controls the measurement and the monitoring of the actual value of the cathode potential during the operational conditions. The monitoring is performed, for example by the conditioning unit 63', where the actual value for the cathode potential is compared to a preset value corresponding to the maximum allowable height of the cathode depositions. In case the preset value is not reached the application of the machining pulses is actuated, otherwise the application of the optimal inverse pulses is actuated by the actuation unit 65', where the duration of the optimal pulse are taken from the corrected table 69 stored in the storage unit 66. After the cleaning operation the program returns to the step 61'.

FIG. 7 presents in a schematic way an embodiment of a main window of the user interface of the computer program according to the invention. The main window 70 comprises a field 71 arranged to carry out a digital interfacing to a digital oscilloscope arranged to monitor the course of the curve of the cathode potential $\phi$ in the intervals between the machining pulses. At a certain pre-selected moment 72, preferably directly preceding an application of a subsequent machining pulse, the actual value of the cathode potential is measured by the digital oscilloscope and can be given in a textual window T for user convenience. The main-window 70 comprises a control window 73, where relevant process control information is output. This information is acquired by means of an interfacing to a data exchange system (not shown) of the process control means (not shown). For example, in a sub-window 74 the mode of operation can be indicated (pause, machining, cleaning). A sub-window 75 can be arranged to present the actual values of the operational parameters, such as the actual value of the cathode potential, the maximum allowable value of the cathode potential and other relevant data. The main window 70 can be configured to comprise further a graphical interface 77, arranged to present a graphical output of the actual value of the height of the cathode depositions h and the intervals BP, where the optimal pulses of the inverse polarity are being applied. In this way a user has an accurate information about the parameters and conditions of the running electrochemical process.

The invention claimed is:

1. A method for determining an optimal mode for a removal of cathode depositions from an electrode during an electrochemical machining of an electrically conductive work piece in an electrolyte by means of applying bipolar electrical pulses between the work piece and the electrode, one or more voltage pulses of an unipolar machining polarity being alternated with voltage pulses of an inverse polarity while a gap between the work piece and the electrode is maintained, said gap being filled by the electrolyte, wherein during said optimal mode an optimal duration of the pulses of the inverse polarity is selected, said optimal duration being determined from a first calibration carried out preceding the machining of the work piece and a second calibration carried out during the machining of the work piece.

2. A method according to claim 1, wherein the first calibration comprises determining a dependence between a variable having a range of values corresponding to a range of heights of the cathode depositions generated on an initially clean metallic surface and a range of pulse durations of a suitable pulse of the inverse polarity necessary to remove said depositions from said surface.

3. A method according to claim 2, wherein the first calibration comprises the steps of:
performing a machining of a set of samples with unipolar machining pulses in order to yield a range of surface conditions;
assigning variables characterizing the yielded surface conditions;
applying a pulse of the inverse polarity having a pulse duration per sample in order to remove yielded surface conditions;
performing a calibration of a dependence between the variables and the inverse pulse durations required to remove said yielded surface conditions from the samples.

4. A method according to claim 1, wherein the second calibration comprises the steps of:
performing a machining of the work piece by applying one or more pulses of the unipolar machining polarity until an a-priori defined condition is satisfied, said machining resulting in a first condition of a surface of the electrode;
assigning a variable characterizing the first condition of the surface of the electrode;
performing a measurement of a first value of an operational parameter representative to the first condition of the surface of the electrode;
performing an application of a pulse of the inverse polarity corresponding to the first condition of the surface of the electrode, said application resulting in a second condition of the surface of the electrode, parameters of said inverse pulse being determined from the first calibration;
performing a measurement of a second value of the operational parameter representative of the second condition of the surface of the electrode;
performing a calibration of the variable based on the first value and the second value of the operational parameter.

5. A method according to claim 2, wherein a height of the cathode depositions is selected as the variable characterizing the surface condition of the electrode.

6. A method according to claim 5, wherein a cathode potential is selected as the operational parameter.

7. A method according to claim 5, wherein in a region, corresponding to an interval between the unipolar machining voltage pulses, an area under a curve of the electrode potential is derived, said area being selected as the operational parameter.

8. A method according to claim 5, wherein for short intervals between unipolar machining voltage pulses a slope of the curve of the electrode potential is derived in an interval between the unipolar machining voltage pulses, said slope being selected as the operational parameter.

9. A method according to claim 5, wherein the absolute value of the first harmonics of the Fourier transform of a cathode potential pulse is selected as the operational parameter.

10. A method for electrochemical machining of an electrically conductive work piece in an electrolyte by applying bipolar electrical pulses between the work piece and an electrode, one or more voltage pulses of an unipolar machining polarity being alternated with voltage pulses of an opposite polarity while a gap between the work piece and the electrode in maintained, said gap being filled by the electrolyte, wherein said method comprises the steps of:
establishing an optimal pulse duration for pulses of the inverse polarity for a removal of the cathode depositions from an electrode surface during the electrochemical machining, said optimal pulse duration being determined from a first calibration carried out preceding the machining of the work piece and a second calibration carried out during the machining of the work piece;

performing a control of the machining of the work piece by means of a monitoring of an actual value of an operational parameter and comparing said actual value of the operational parameter to a preset value of the operational parameter;

applying a pulse of the inverse polarity of the optimal pulse duration in case the actual value of the operational parameter is greater than the preset value of the operational parameter.

11. A method according to claim 10, wherein a height of cathode depositions is selected as said variable.

12. A method according to claim 11, wherein a cathode potential is selected as the operational parameter.

13. A control system arranged to control an automatic removal of cathode depositions from a surface of an electrode during a bipolar electrochemical machining, wherein said system comprises:

probing means arranged to perform a measurement of a value of an operational parameter;

calibration means arranged to perform a numerical calibration of a variable representative to a condition of the surface of the electrode based on the value of the operational parameter;

a storage unit arranged to store a dependence between the variable and a duration of an optimal inverse pulse necessary to remove said condition;

monitoring means arranged to monitor an actual value of the operational parameter;

a logical unit arranged to compare said actual value of the operational parameter with a preset value of the operational parameter and to actuate an application of the optimal pulses of inverse polarity in case the actual value of the operational parameter is greater than the preset value of the operational parameter, parameters of the optimal inverse pulse being determined by the calibration and the dependence stored in the storage unit.

14. An apparatus for electrochemical machining of an electrically conductive work piece comprising the control system according to claim 13.

15. A computer program arranged to be loaded in to a computer and to control the computer, when loaded, to function as the control system as claimed in claim 13.

* * * * *